M. L. CONNOR.
TIRE DEFLATING TOOL.
APPLICATION FILED SEPT. 12, 1912.
1,058,557.
Patented Apr. 8, 1913.
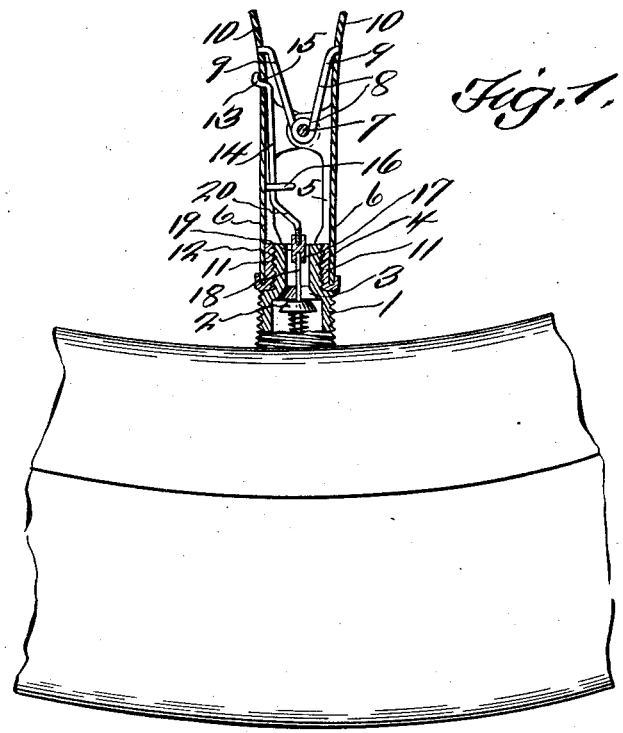
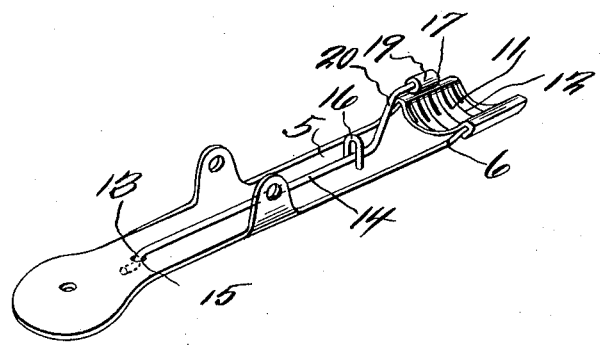
Witnesses
Robt Meyer,
Francis T. Boswell,
Inventor
M. L. Connor,
By D. Swift & Co
his Attorneys

UNITED STATES PATENT OFFICE.

MICHAEL LEWIS CONNOR, OF PONY, MONTANA.

TIRE-DEFLATING TOOL.

1,058,557. Specification of Letters Patent. Patented Apr. 8, 1913.

Application filed September 12, 1912. Serial No. 719,974.

*To all whom it may concern:*

Be it known that I, MICHAEL LEWIS CONNOR, a citizen of the United States, residing at Pony, in the county of Madison and State of Montana, have invented a new and useful Tire-Deflating Tool; and I do hereby declare, the following to be a full, clear, and exact description of the invention, such as will enable others skilled in the art to which it appertains to make and use the same.

This invention relates to a new and useful tire deflating tool.

One of the objects of the invention is to provide a simple, efficient, desirable and practical tool of this nature, comprising a pair of spring tensioned clamping jaws, one of which is provided with a spring arm having its free portion guided in an eye loop, and terminating in a socket end adapted to engage the valve stem of a pneumatic tire, for effectually holding the valve open, while the clamping jaws clamp the end of the valve casing, in order to deflate the pneumatic tire.

Another object of the invention is to construct the clamping portions of the jaw with softer material than the valve casing and with teeth, to firmly clamp to the valve casing.

The invention comprises further features and combination of parts, as hereinafter set forth, shown in the drawings and claimed.

In the drawings:—Figure 1 is a sectional view of the valve casing of a pneumatic tire, showing the application of the improved deflating tool. Fig. 2 is a detail view.

Referring to the drawings 1 designates the valve casing, which is of the usual construction, and which is provided with the conventional form of valve 2 to coöperate with the seat 3. The valve casing is constructed with a reduced threaded extension 4.

The deflating tool 5 comprises the clamping jaws 6 pivoted together by the pin 7, there being a spring 8 coiled upon the pin, the arms 9 of which spring engage the handles 10, which are extensions of the jaws. The clamping ends of the jaws are lined with softer material 11 than the reduced extension of the valve casing, in order to insure a firm grip on said extension. The said material may be leather, rubber, or other fiber or the like having threads 12 to engage the threads of the valve casing extension, so as to insure the jaws against displacement. One of the jaws is provided with an aperture, in which the angular lug 13 of the spring arm 14 is arranged, said aperture being denoted by the character 15. The free portion of the spring arm 14 is guided in an eye loop 16, while the extremity of the spring arm terminates in a socket 17 to receive the end of the valve extension stem 18, so as to hold the valve unseated, when the tool is applied as shown in Fig. 1. The socket is formed in a member 19, which is threaded to an offset portion 20 of the spring arm. By pressing the handles of the jaws together the jaws may be disengaged from the extension of the valve casing, thereby allowing the valve to close.

The invention having been set forth, what is claimed as new and useful is:—

In combination, a pair of spring tensioned jaws pivoted together and terminating in handles adapted to clamp a threaded extension of a valve casing of a pneumatic tire, the clamping jaws having threaded linings of softer material of substance than the valve casing, thereby insuring a firm gripping action on the casing, one of the jaws having an aperture, a spring arm having an angular end secured in said aperture and having its free portion terminating in an offset extension having threads, a socket member threaded to the offset extension adapted to receive an extension stem of a valve in said casing for holding the same unseated, and an eye loop secured to one of the jaws, in which the spring arm is guided.

In testimony whereof I have signed my name to this specification in the presence of two subscribing witnesses.

MICHAEL LEWIS CONNOR.

Witnesses:
JAMES WILKIE,
FRANK C. MYERS.

Copies of this patent may be obtained for five cents each, by addressing the "Commissioner of Patents, Washington, D. C."